Oct. 28, 1941.  J. E. WAINWRIGHT  2,260,918
APPARATUS FOR FORMING OR DRESSING GRINDING WHEELS FOR
USE IN FORM-GRINDING OPERATIONS
Filed July 11, 1940

Inventor:
John Ernest Wainwright
by Babcock & Babcock
Attorneys

Patented Oct. 28, 1941

2,260,918

UNITED STATES PATENT OFFICE 2,260,918

APPARATUS FOR FORMING OR DRESSING GRINDING WHEELS FOR USE IN FORM-GRINDING OPERATIONS

John Ernest Wainwright, Coventry, England, assignor to Coventry Gauge & Tool Company Limited, Coventry, England Application July 11, 1940, Serial No. 344,992
In Great Britain November 8, 1938

6 Claims. (Cl. 125—11)

This invention relates to apparatus for forming or dressing grinding wheels for use in form-grinding operations in which the form is of a special kind such, for example, as is required in hobs for machining splines by a generating motion. In this method of producing splines it is necessary for the teeth of the hob to have such a curve as will generate plane surfaces at the sides of the splines parallel with each other and with a radial plane passing through the centre of the spline. This curve is one of irregular progression and is at present obtained by trial and error from a former-controlled hob-grinding wheel.

The object of the present invention is to provide means for generating curves of the kind referred to by a combination of angular or polar and rectilinear motions.

According to the present invention the dressing tool is arranged to have a rectilinear motion along a radius of the polar motion and at the same time a rectilinear motion in a direction which varies in relation to the radial component according to the extent of the polar motion.

In the accompanying drawing.

Figure 1:
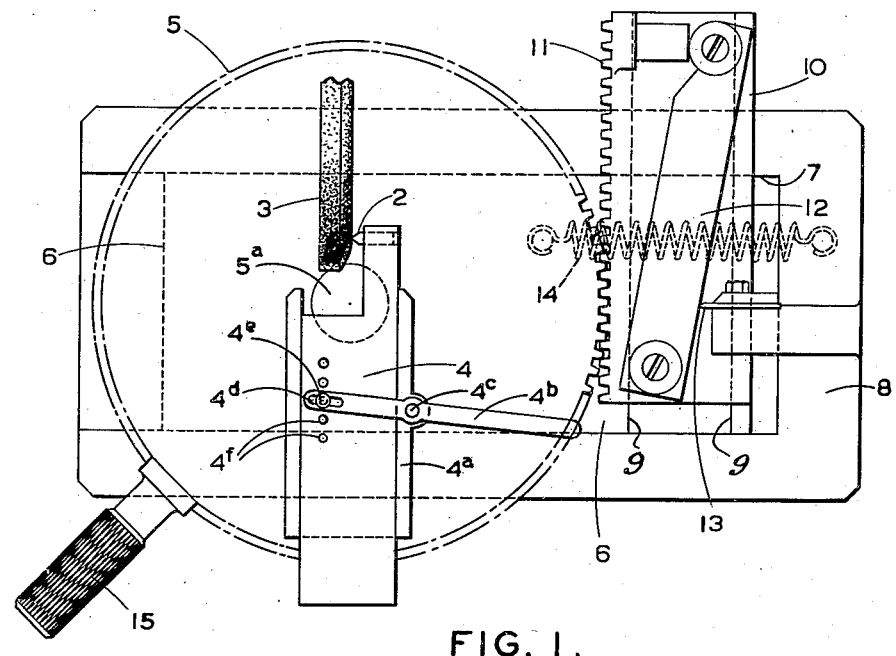
Figure 1 shows the improved wheel dressing apparatus with the parts thereof in the positions they occupy at the commencement of the dressing operation.
Figure 2:
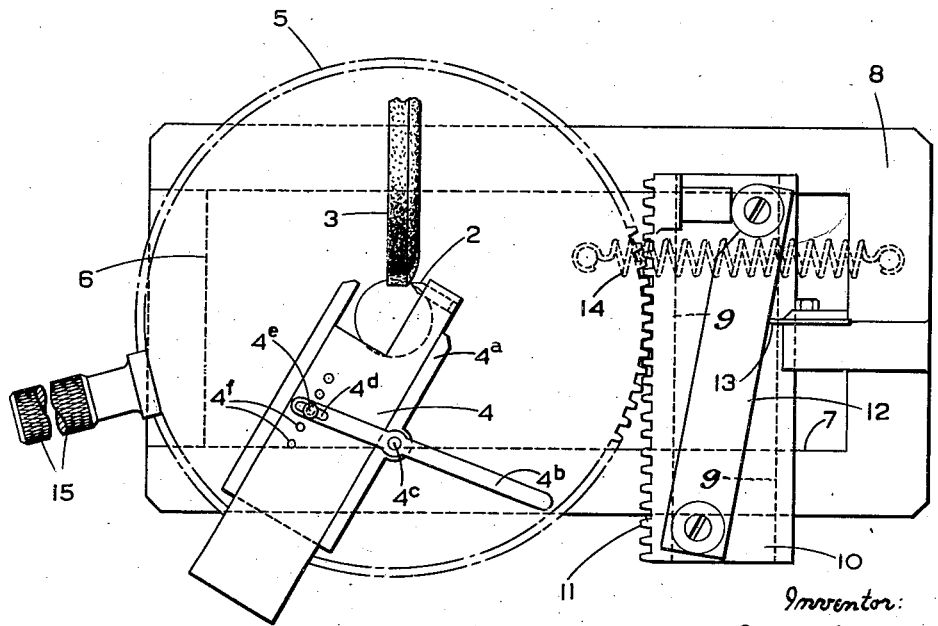
Figure 2 is a similar view of the apparatus during the dressing operation.

In the construction shown, the dressing tool 2 for the grinding wheel 3 is adjustably mounted in any suitable manner in a slide 4 which is carried by a rotatable toothed wheel 5 and has a radial movement thereon in guides $4^a$. This radial movement can be imparted to the slide 4 by means of a hand lever $4^b$, pivoted at $4^c$ to one of the guides and having a slotted end $4^d$ engaging a pin $4^e$ which may be inserted in any one of a longitudinal series of holes $4^f$ in the slide 4 according to the diameter of the grinding wheel.

The toothed wheel 5 is rotatably mounted about an arbor $5^a$ on a main slide 6 which is free to move between guides 7 in a relatively stationary base plate 8. Mounted in guides 9 in one end of the main slide 6 is a cross slide 10, one edge of which is formed with a toothed rack 11 in permanent mesh with the teeth of the gear wheel 5. The said cross-slide carries an adjustable sine bar 12 co-operating with a stylus 13 fixed to the adjacent end of the stationary base plate 8. Contact between the stylus and the sine bar is at all times maintained by means of a tension spring 14 attached at one end to the main slide 6 and anchored at the other end to the base plate 8. The direction and extent of the relative movement between the sine bar and the stylus and hence the direction and extent of the movement of the main slide and of one of the rectilinear components of the compound movement of the dressing tool, will depend upon the direction and extent of the angular motion of the gear wheel 5.

The operation of the apparatus is such that when the wheel 5 is swung about its rotational centre on the slide 4 by means of the handle 15, the slide 4 at the same time also receives a rectilinear movement in the base plate by reason of the geared connection between the cross slide 10 and gear wheel 5 and the co-operation between the sine bar thereon and the stylus 13. At the same time the slide carrying the dressing tool is reciprocated in a radial direction on the gear wheel by means of the hand lever $4^b$. The combined effect of the angular motion of the gear wheel 5 together with its rectilinear movement of translation by the main slide, and the radial reciprocation of the dressing tool, is to cause the latter to produce the required form on the grinding wheel. For example, if the dressing tool is off-set to the required amount, say, one half of the width of the spline and the sine bar is adjusted to an angle equivalent to the predetermined normal pitch of the hob the combination of the rotational movement of the wheel 5 and the oscillation of the dressing tool will generate a convex curve on the grinding wheel 3 which when reproduced on the hob will produce plane surfaces at the sides of the splines parallel with each other and with a radial line passing through the centre of the spline.

This curve whilst retaining the characteristics due to its method of generation can be modified within limits by appropriate adjustment of the inclination of the sine bar and/or by adjusting the position of the dressing tool relative to the diameter along which the slide 4 moves upon the toothed wheel or quadrant.

Formers produced by means of a grinding wheel dressed in the manner above described can be used for forming hob grinding wheels in any suitable manner and in any desired ratio.

I claim:

1. Apparatus for dressing grinding wheels comprising a stationary base, a main slide mounted for longitudinal movement on said base, a cross slide mounted for transverse sliding movement on said main slide and having a toothed portion on one side thereof, a sine bar carried by said cross slide, and a stylus fixedly carried by said stationary base in operative engagement with said sine bar to cause longitudinal movement of said main slide during transverse movement of said cross slide, in combination with a rotary gear member mounted for rotary movement on said main slide in mesh with the toothed portion of said cross slide to cause transverse movement thereof during rotation, and a dressing tool mounted for radial reciprocation on said gear member.

2. Apparatus for dressing grinding wheels comprising a stationary base, a main slide mounted for longitudinal movement on said base, a cross slide mounted for transverse sliding movement on said main slide and having a toothed portion along one side thereof, a rotary gear member mounted for rotary movement on said main slide in mesh with the toothed portion of said cross slide to cause transverse movement thereof, and a dressing tool mounted for sliding movement on said gear member, in combination with means associated with said cross slide and said base for causing longitudinal movement of said main slide during transverse movement of said cross slide.

3. Apparatus for dressing grinding wheels comprising a stationary base, a main slide mounted for longitudinal movement on said base, a cross slide mounted for transverse movement on said main slide, a sine bar carried by said cross slide, and a stylus fixedly mounted on said base in operative engagement with said sine bar to cause longitudinal movement of said main slide during transverse movement of said cross slide, in combination with a rotary member mounted for rotation on said main slide, a dressing tool slidably mounted on said rotary member, and means operatively connecting said rotary member and cross slide to cause transverse movement of said cross slide during rotation of said rotary member.

4. Apparatus for dressing grinding wheels comprising a stationary base member, a main slide mounted for longitudinal movement on said base member, a cross slide member mounted for transverse movement on said main slide, a stylus carried by one of said members, and a sine bar carried by the other of said members in operative engagement with said stylus to cause longitudinal movement of said main slide during transverse movement of said cross slide member, in combination with a rotary member mounted for rotation on said main slide, a dressing tool carried by said rotary member, and means operatively connecting said rotary member and cross slide member to cause transverse movement of said cross slide member during rotation of said rotary member.

5. Apparatus for dressing grinding wheels comprising a stationary base, a main slide mounted for longitudinal movement on said base, a cross slide mounted for transverse movement on said main slide, and means carried by and operatively connecting said cross slide and said base respectively to produce longitudinal movement of said main slide during transverse movement of said cross slide, in combination with a rotary member mounted for rotation on the main slide, a dressing tool carried by said rotary member, and means operatively connecting said rotary member and cross slide to cause transverse movement of said cross slide during rotation of said rotary member.

6. Apparatus for dressing grinding wheels comprising a stationary base, a main slide mounted for longitudinal movement on said base, a rotary member mounted for rotation on said main slide, a dressing tool carried by said rotary member and disposed for radial reciprocation relative thereto, means for reciprocating said dressing tool, and mechanism carried by said main slide in engagement with said rotary member for causing longitudinal movement of said main slide simultaneous with and proportional to the rotation of said rotary member.

JOHN ERNEST WAINWRIGHT.